(12) United States Patent
 Huang

(10) Patent No.: US 12,617,681 B2
(45) Date of Patent: May 5, 2026

(54) METHOD OF REMOVING HYDROGEN PEROXIDE FROM SULFURIC ACID

(71) Applicant: Cheng Ming Huang, Kaohsiung (TW)

(72) Inventor: Cheng Ming Huang, Kaohsiung (TW)

(73) Assignee: Jingbao Chemical Co., Ltd., Kaohsiung (TW)

( * ) Notice: Subject to any disclaimer, the term of this patent is extended or adjusted under 35 U.S.C. 154(b) by 404 days.

(21) Appl. No.: 18/216,548

(22) Filed: Jun. 29, 2023

(65) Prior Publication Data

US 2023/0339754 A1      Oct. 26, 2023

Related U.S. Application Data

(63) Continuation-in-part of application No. 17/028,989, filed on Sep. 22, 2020, now abandoned.

(51) Int. Cl.
  *C01B 17/90*      (2006.01)
  *C01B 17/78*      (2006.01)
  *C01G 3/12*      (2006.01)

(52) U.S. Cl.
  CPC .............. *C01B 17/90* (2013.01); *C01B 17/78* (2013.01); *C01G 3/12* (2013.01); *C01P 2006/80* (2013.01)

(58) Field of Classification Search
  None
  See application file for complete search history.

(56) References Cited

U.S. PATENT DOCUMENTS

2021/0002136 A1      1/2021  Huang

FOREIGN PATENT DOCUMENTS

CN      108706557 A  *  10/2018  ............. C01B 17/90

OTHER PUBLICATIONS

Machine translation of Li, CN108706557A (Year: 2018).*
Mlasi et al., Kinetics of the decomposition of hydrogen peroxide in acidic copper sulfate solutions, Ind. Eng. Chem. Res., 2015, 54, 5589-5597 (Mlasi) (Year: 2015).*
Water surface cleaning (published on Aug. 7, 2020, https://web.archive.org/web/20200807011324/https://www.mksinst.com/n/wafer-surface-cleaning) (MKS) (Year: 2020).*
Tokuda et al., Study on reaction kinetics and selective precipitation of Cu, Zn, Ni and Sn with H2S in single-metal and multi-metal systems, Chemosphere, 2008, 73, 1448-1452 (Tokuda) (Year: 2008).*
Pubchem, https://web.archive.org/web/20190819125124/https://pubchem.ncbi.nlm.nih.gov/compound/Copper-sulfate#section=2D-Structure (Year: 2019).*

* cited by examiner

*Primary Examiner* — Keling Zhang

(57)      ABSTRACT

A method of removing hydrogen peroxide from sulfuric acid includes the following steps: First step of pouring the sulfuric acid having 0.1 wt % to 10 wt % of hydrogen peroxide into a vessel. Second step of adding a catalyst containing copper and a copper compound to the vessel to undergo a reaction with the sulfuric acid to remove the hydrogen peroxide from the sulfuric acid, to generate heat, and to generate metal ions in the sulfuric acid. Third step of activating a cooling device to cool the vessel to a predetermined temperature range. Fourth step of adding hydrogen sulfide to the vessel to undergo a reaction with the metal ions to generate metallic sulfide and metal free sulfuric acid. Fifth step of purifying the metallic sulfide and the metal free sulfuric acid to obtain purified metallic sulfide and purified sulfuric acid as products.

1 Claim, 2 Drawing Sheets

| item | checking | unit | analysis method |
|---|---|---|---|
| appearance | clean | - | by eyes |
| sulfuric acid | 60.95 | % | CNS997 for sulfuric acid test |
| specific weight | 1.508 | - | specific weight gauge |
| iron | 1.82 | mg/L | ICP-OES |
| aluminum | 0.05 | mg/L | ICP-OES |
| lead | 0.01 | mg/L | ICP-OES |
| chromium | 0.07 | mg/L | ICP-OES |
| manganese | ND | mg/L | ICP-OES |
| nickle | 0.16 | mg/L | ICP-OES |
| cadmium | 0.01 | mg/L | ICP-OES |
| zinc | 0.03 | mg/L | ICP-OES |
| calcium | 2.14 | mg/L | ICP-OES |
| arsenic | ND | mg/L | ICP-OES |
| copper | 0.18 | mg/L | ICP-OES |
| hydrogen peroxide | 0.00 | mg/L | CN2527 for hydrogen peroxide test |
| COD | 22.00 | mg/L | NIEA W517.52B closed potassium dichromate reflux |

FIG. 2

METHOD OF REMOVING HYDROGEN PEROXIDE FROM SULFURIC ACID

CROSS-REFERENCE TO RELATED APPLICATION

This application is a continuation-in-part (CIP) of U.S. patent application Ser. No. 17/028,989, filed Sep. 22, 2020, now abandoned, which is incorporated herein by reference in its entirety.

BACKGROUND OF THE INVENTION

1. Field of the Invention

The invention relates to methods of removing hydrogen peroxide from sulfuric acid and more particularly to a method of removing hydrogen peroxide from waste sulfuric acid so that products (e.g., copper (II) sulfide (CuS) of high purity and highly purified, diluted sulfuric acid ($H_2SO_4$)) can be reused.

2. Description of Related Art

Conventionally, sulfuric acid of high purity is used to clean the surface of an etched silicon wafer in a semiconductor manufacturing process. Hydrogen peroxide ($H_2O_2$) is added to the sulfuric acid ($H_2SO_4$) to form a strong oxidizing agent which is adapted to oxidize organic substances of the wafer into $CO_2$ and $H_2O$. At the end of the process, waste sulfuric acid ($H_2SO_4$) is generated. The waste sulfuric acid comprises 40 wt %-80 wt % of sulfuric acid ($H_2SO_4$), 4 wt %-8 wt % of hydrogen peroxide ($H_2O_2$), and water being the remaining substance in terms of concentration.

However, there are contaminants in the waste sulfuric acid. The hydrogen peroxide ($H_2O_2$) in the contaminants is a strong oxidizing agent and can limit reusability of the sulfuric acid ($H_2SO_4$). Thus, the waste sulfuric acid cannot be used again for clean wafers in the semiconductor manufacturing process. Conventionally, the hydrogen peroxide ($H_2O_2$) is removed from the waste sulfuric acid with other products being generated for reuse in a semiconductor manufacturing company.

Conventionally, there are many methods of removing hydrogen peroxide from waste sulfuric acid. One of the most widely used methods comprises the step of adding hydrochloric acid (HCl) in the waste sulfuric acid to undergo a reaction with the hydrogen peroxide ($H_2O_2$). It is noted that hydrochloric acid (HCl) is both a reactant and a catalyst. The expression is shown below.

$$H_2O_2 + 2HCl \rightarrow Cl_{2(g)} + 2H_2O$$

The other most widely used method comprises the step of adding activated carbon or enzyme to the waste sulfuric acid to undergo a reaction with the hydrogen peroxide ($H_2O_2$) for dissolving the hydrogen peroxide ($H_2O_2$).

The conventional methods of removing hydrogen peroxide from waste sulfuric acid have the following drawbacks: While certain amount of hydrogen peroxide ($H_2O_2$) can be removed from the waste sulfuric acid by adding hydrochloric acid (HCl) to the waste sulfuric acid, there is diluted sulfuric acid ($H_2SO_4$) having chlorine ions ($Cl^-$) in the final product. The chlorine ions ($Cl^-$) can corrode the apparatus used in the method and in turn lower the quality of the products. While enzyme added to the waste sulfuric acid can remove hydrogen peroxide from the waste sulfuric acid, the amount of the hydrogen peroxide is relatively low. Further, the chemical reaction takes a relatively long time, thereby greatly increasing the processing cost.

Thus, the need for improvement still exists.

SUMMARY OF THE INVENTION

It is therefore one object of the invention to provide a method of removing hydrogen peroxide from sulfuric acid comprising the steps of pouring the sulfuric acid ($H_2SO_4$) having 0.1 wt % to 10 wt % of hydrogen peroxide ($H_2O_2$) into a vessel; adding a catalyst containing copper and a copper compound to the vessel to undergo a reaction with the sulfuric acid ($H_2SO_4$) to remove the hydrogen peroxide ($H_2O_2$) from the sulfuric acid ($H_2SO_4$), to generate heat, and to generate metal ions in the sulfuric acid ($H_2SO_4$); activating a cooling device to cool the vessel to a predetermined temperature range; adding hydrogen sulfide ($H_2S$) to the vessel to undergo a reaction with the metal ions to generate metallic sulfide and metal free sulfuric acid ($H_2SO_4$); and purifying the metal free sulfuric acid ($H_2SO_4$) to obtain purified metallic sulfide and purified sulfuric acid ($H_2SO_4$) as products.

The above and other objects, features and advantages of the invention will become apparent from the following detailed description taken with the accompanying drawings.

BRIEF DESCRIPTION OF THE DRAWINGS

FIG. 2 is a table of test reports regarding the invention.

DETAILED DESCRIPTION OF THE INVENTION

Figure 1:
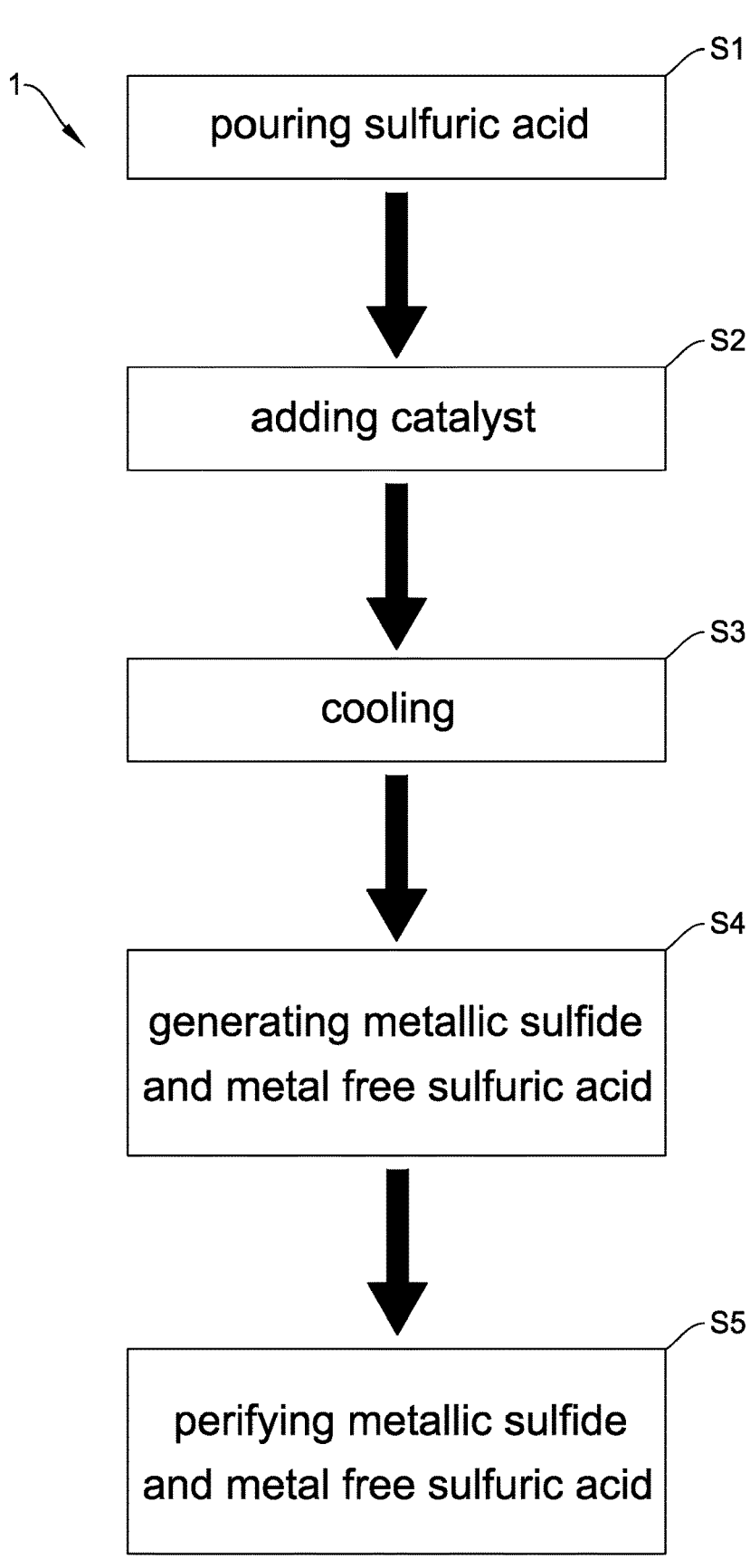
FIG. 1 is a flowchart of a method of removing hydrogen peroxide from sulfuric acid according to the invention.

Referring to FIG. 1, a method 1 of removing hydrogen peroxide from sulfuric acid in accordance with the invention is illustrated and comprises the steps of S1 pouring the sulfuric acid ($H_2SO_4$) having 0.1 wt % to 10 wt % of hydrogen peroxide ($H_2O_2$) into a vessel; S2 adding a catalyst containing copper and a copper compound (e.g., cupric oxide (CuO)) to the vessel to undergo a reaction with the sulfuric acid ($H_2SO_4$) to remove the hydrogen peroxide ($H_2O_2$) from the sulfuric acid ($H_2SO_4$), to generate heat, and to generate metal (e.g., copper (Cu)) ions in the sulfuric acid ($H_2SO_4$); S3 activating a cooling device to cool the vessel to a predetermined temperature range; S4 adding hydrogen sulfide ($H_2S$) to the vessel to undergo a reaction with the metal ions to generate metallic sulfide (e.g., copper (II) sulfide (CuS)) (e.g., removing copper ions) and metal free sulfuric acid ($H_2SO_4$); and S5 purifying the metal free sulfuric acid ($H_2SO_4$) to obtain purified metallic sulfide and purified diluted sulfuric acid ($H_2SO_4$) as products.

A portion of expression of step S2 is below.

$$CuO_{(s)} + H_2SO_{4(l)} \rightarrow CuSO_{4(l)} + H_2O_{(l)}$$

$$2H_2O_{2(l)} \xrightarrow{Cu^+} 2H_2O_{(l)} + O_{2(g)}$$

Expression of step S4 is below.

$$H_2S_{(g)} + CuSO_{4(l)} \rightarrow CuS_{(s)} \downarrow + H_2SO_{4(l)}$$

It is noted that great heat is generated when sulfuric acid ($H_2SO_4$) undergoes a chain reaction with the catalyst (e.g., cupric oxide (CuO)). The heat generation process continues until the materials involved in the reaction are consumed. This is very dangerous because the vessel and associated devices can be damaged or even causes explosion. Thus, a cooling device is activated to cool the vessel to 60° C.-90° C. in step S3 so that the method 1 can be performed successfully.

In one embodiment, only about 180-200 g of the catalyst is required for removing about 11,000 kg of hydrogen peroxide from sulfuric acid.

Preferably, activated carbon is added to the products produced by step S5 for absorbing smell.

No chlorine ions are generated by the method of the invention when the products are produced. This ensures that the quality products of hydrogen peroxide free are useful for further uses and applications. Particularly, the purified, diluted sulfuric acid ($H_2SO_4$) finds wide chemical applications.

Referring to FIG. 2, it shows a table of test reports regarding the invention. It is found that hydrogen peroxide is substantially removed from the purified, diluted sulfuric acid ($H_2SO_4$) thus can be reused.

The invention has the following advantages and benefits in comparison with the conventional art:

The purified, diluted sulfuric acid ($H_2SO_4$) thus can be reused. Particularly, both products, i.e., copper (II) sulfide (CuS) of the purity and the purified, diluted sulfuric acid ($H_2SO_4$), are adapted to reuse. Still particularly, the highly purified, diluted sulfuric acid ($H_2SO_4$) finds wide chemical applications. Therefore, the waste sulfuric acid having hydrogen peroxide, after treated by the method of the invention, can be reused in wide applications.

The products are reusable. Both products, i.e., purified copper (II) sulfide (CuS) and the purified, diluted sulfuric acid ($H_2SO_4$), are adapted to reuse by removing hydrogen peroxide from the waste sulfuric acid.

Copper ions based catalysts do not generate chlorine ions. The copper ions based catalysts can produce purified metallic sulfide and purified, diluted sulfuric acid without chlorine ions being generated. This ensures the apparatus involved in the method steps to be less liable to corrosion, thereby increasing safety of the method.

While the invention has been described in terms of preferred embodiments, those skilled in the art will recognize that the invention can be practiced with modifications within the spirit and scope of the appended claims.

What is claimed is:

1. A method of removing hydrogen peroxide from sulfuric acid, comprising the steps of:

(i) pouring the sulfuric acid ($H_2SO_4$) having 0.1 wt % to 10 wt % of hydrogen peroxide ($H_2O_2$) into a vessel;

(ii) adding a catalyst containing cupric oxide to the vessel to undergo a reaction with the sulfuric acid ($H_2SO_4$) to remove the hydrogen peroxide ($H_2O_2$) from the sulfuric acid ($H_2SO_4$), to generate heat, and to generate metal ions in the sulfuric acid ($H_2SO_4$);

(iii) activating a cooling device to cool the vessel to a predetermined temperature range;

(iv) adding hydrogen sulfide ($H_2S$) to the vessel to undergo a reaction with the metal ions to generate metallic sulfide and metal free sulfuric acid ($H_2SO_4$);

(v) purifying the metal free sulfuric acid ($H_2SO_4$) to obtain purified metallic sulfide and purified sulfuric acid ($H_2SO_4$) as products; and (vi) adding activated carbon to the products for absorbing smell.

* * * * *